March 21, 1972 J. D. SANTI Re. 27,315
REED SWITCH ADAPTED FOR RAPID CYCLING
Original Filed Aug. 26, 1965 2 Sheets-Sheet 1
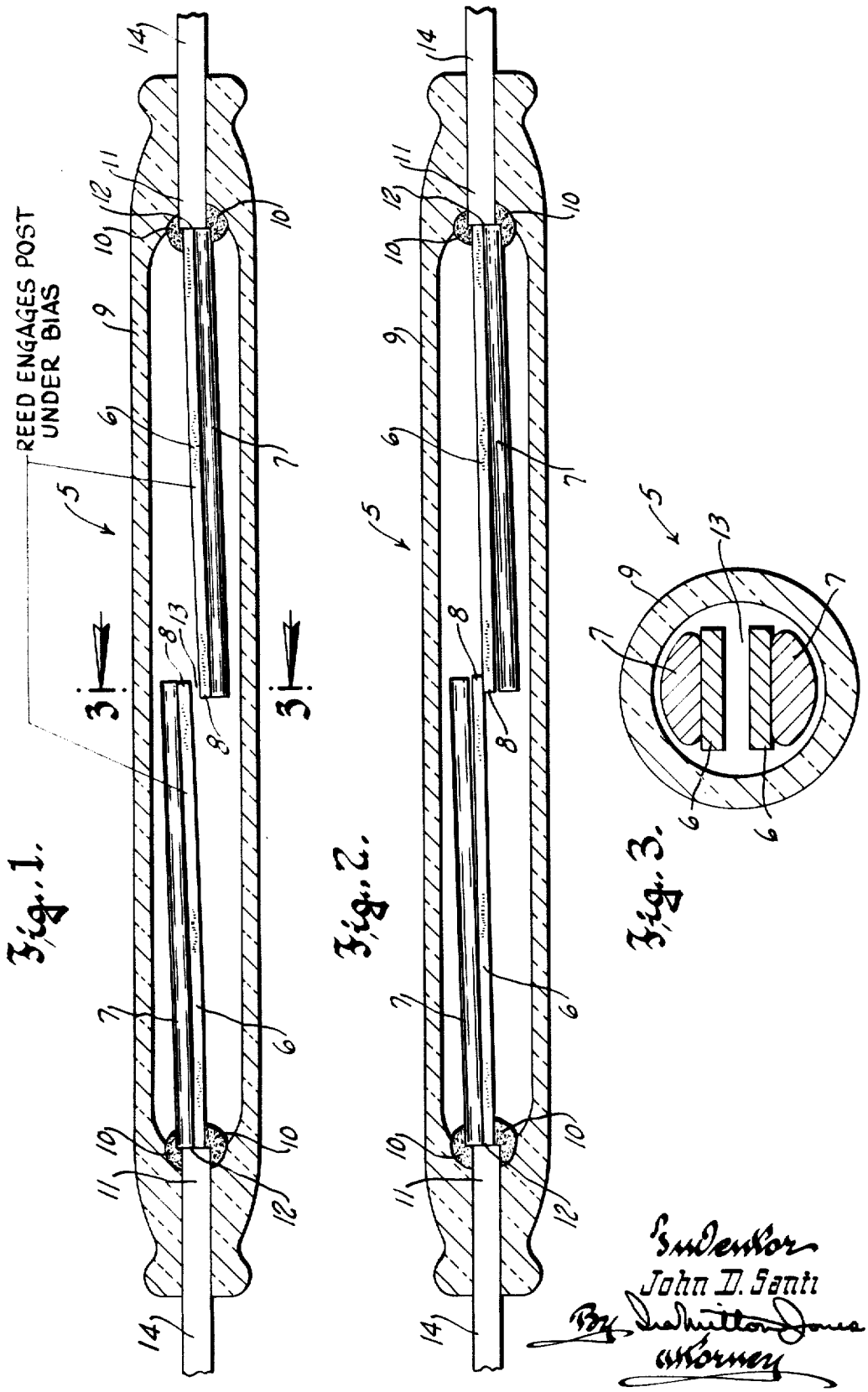
Inventor
John D. Santi
By Schwitter Jones
Attorney

REED SWITCH ADAPTED FOR RAPID CYCLING

Original Filed Aug. 26, 1965 2 Sheets-Sheet 2

Inventor
John D. Santi
By [illegible]
Attorney

United States Patent Office

Re. 27,315
Reissued Mar. 21, 1972

27,315

REED SWITCH ADAPTED FOR RAPID CYCLING

John D. Santi, West Allis, Wis., assignor to Briggs & Stratton Corporation, Milwaukee, Wis.

Original No. 3,315,193, dated Apr. 18, 1967, Ser. No. 482,699, Aug. 26, 1965. Application for reissue July 31, 1970, Ser. No. 60,055
Int. Cl. H01h *51/28*
U.S. Cl. 335—154 6 Claims

Matter enclosed in heavy brackets [ ] appears in the original patent but forms no part of this reissue specification; matter printed in italics indicates the additions made by reissue.

*ABSTRACT OF THE DISCLOSURE*

*A reed switch wherein each reed is provided with a relatively thicker post extending along the reed at the side remote from the other reed and the post is secured to the fixed end of its reed only.*

This invention relates to magnetically actuated dry reed switches and refers more particularly to a dry reed switch which is especially well suited for use in applications where the switch is required to open and close rapidly at recurrent intervals of short duration.

A dry reed switch is a well known device that comprises, in its normally open version, a pair of resilient metal reeds which extend axially into an evacuated tube from opposite ends thereof with their tip portions overlapping in the medial portion of the tube and laterally spaced apart by a small distance. The reeds are magnetically permeable; hence when a magnetic field is caused to thread the reeds and the gap between them, the tip portions of the reeds are magnetically attracted and the reeds flex into switch closing engagement with one another.

It has long been appreciated that the reed switch possesses, in theory, many desirable characteristics that adapt it very well for use in applications where it is required to open and close an electrical circuit at short and frequent intervals. The small mass of the reeds enables them to respond very quickly to changes in a magnetic field to which they are subjected. Furthermore a reed switch can be actuated by an instrumentality such as a solenoid or a permanent magnet which does not make physical contact with the reeds; hence the reed switch eliminates many of the problems of friction and mechanical wear that might be encountered with other types of switching apparatus in installations where rapid and frequently repeated on-and-off operation is required.

Heretofore, however, these promises of the reed switch have not been fully realized in practice, and the present invention has as its general object to overcome the deficiencies which had previously existed in the normally open reed switch and which had rendered it unacceptable for use in mechanisms requiring each of a rapid succession of switch openings and switch closings to occur in precisely timed relationship to the cyclical build-up and decay of a magnetic field whereby the switch was actuated.

Thus the present invention is directed to the solution of certain long standing and well recognized problems that have been encountered with heretofore conventional reed switches. While such problems were especially troublesome where a reed switch was required to close and open recurrently at short intervals, they also existed in cases where substantially long time intervals occurred between each opening and closing cycle.

When the reeds of a normally open reed switch are flexed toward one another in response to the magnetic attraction between their adjacent tips, stresses develop in the reeds by which they are urged back toward their normally open positions and which of course oppose the magnetic attraction between the reeds. With prior reed switches the flexing stresses in the reeds developed concurrently with magnetic attraction between their tips. During the initial stage of magnetic field build-up the opposing magnetic and stress forces on each reed were nearly in equilibrium, and the reed tips moved toward one another relatively slowly and through only a small distance. As build-up of the field continued, the magnetic attraction forces increased much more rapidly than the flexing forces in the reeds, inasmuch as the attraction between the reed tips varied inversely with the square of the distance between them as well as directly with the ampere turns of the field, while the biasing forces in the reeds increased only in linear proportion to their deflection. In consequence, the reed tips were rapidly accelerated into engagement with one another during a second stage of field build-up, thereby acquiring a substantial amount of momentum which caused them to rebound upon engagement. In many cases such so-called "make bounce" was manifested in a series of rapid and brief collisions and separations of the reed tips. The undesirable nature of "make bounce" has long been recognized in this art, and various expedients have been suggested for its elimination, one such expedient being disclosed in Patent No. 2,497,547, issued Feb. 14, 1950, to C. E. Hastings.

At first blush it might seem that "make bounce" could be eliminated, or very substantially minimized, by reducing the separation between the reeds in their normal open or at-rest positions, so that during their swing toward one another the reeds could not build up sufficient momentum for a bounce. In prior reed switches, however, this expedient ran headlong into another problem. If the gap between the reeds was too small, they were placed under only a light flexing stress in their closed positions, with the result that the rate of contact separation was reduced at switch opening, producing poor switch opening performance.

"Make bounce" could develop both in rapid cycling of a reed switch and in a single closure, but it was likely to be most undesirable in situations where the switch was subjected to rapid cycling, and where precise timing of switch closure was therefor important so that the erratic timing resulting from "make bounce" could have serious consequences.

The problems posed by "make bounce" in a rapidly cycled reed switch of heretofore conventional construction were further complicated by the mechanical vibration of the reeds after switch opening. When a prior normally open reed switch opened in consequence of decay or disappearance of a magnetic field that had held it shut, the reeds tended to return to their normal or open positions under their own flexing bias, but in doing so they vibrated for a time at a frequency determined by their natural mechanical modes. If the next succeeding build-up of the actuating magnetic field occurred while the reeds were still in vibration, the timing of switch closure tended to be intolerably erratic. If the magnetic field reached its switch closing value just at a time when the vibratory movement of the reeds had carried them toward their positions of maximum separation, the switch closed late. In that event the magnetic flux not only had to overcome the inertia of the reeds but had to do so under a handicap because the magnetic attraction between the tips of the reeds decreased as the square of the distance between them. If the building magnetic field picked up the reeds at a time in their vibration cycle when they were closely approaching one another, the switch would of course close early. Since it was a practical impossibility to coordinate the mechanical frequency of the reeds with the timing of the switching cycle, prior reed switches could not be precisely timed in rapid cycling.

With the foregoing explanation in mind, it is an object of this invention to provide simple and inexpensive means in a normally open reed switch for achieving precise timing of the switch during rapid cycling thereof by taking advantage of the mechanical vibration of the reeds after switch opening. Hence it will be apparent that the present invention takes an approach to the problem that is diametrically opposite from prior efforts in this art, which have been directed toward the minimization or damping of reed vibration after each switch opening so as to bring the reeds to substantially a condition of rest by the time the succeeding build-up of the actuating field occurred.

Another and more specific object of this invention is to provide very simple and inexpensive means in a normally open dry reed switch for preventing separation of the reeds by substantially more than a small predetermined distance during the interval following switch opening, and for causing the reeds to have a somewhat damped vibratory motion for a period following each switch opening, which motion is of high frequency but low amplitude so that the mean air gap between the reeds while they are in such vibratory motion is of a smaller value than their normal or at-rest air gap, whereby the reeds are highly responsive, during their period of vibratory motion, to the build-up of an actuating magnetic field.

A further specific object of this invention is to provide a simple and inexpensive reed switch of the character described wherein "make bounce" is substantially completely eliminated and wherein very rapid and clean separation of the contacts takes place at switch opening despite a small air gap between the reeds.

In general, the several objects of this invention are achieved by providing, for each reed of a normally open reed switch, a relatively thicker post that extends along the reed at the side thereof remote from the other reed and is secured to the fixed end of its reed, the arrangement of each reed and its post being such that the reed is free to swing away from its post but is engaged with its post under bias when the reed is in its normally open or at-rest position.

The extent to which this expedient achieves the objects of this invention may be judged from the fact that carefully made oscilloscope tests on a reed switch embodying the invention have revealed a very small amount of "make bounce" when the switch was actuated from an at-rest condition but have shown no detectable "make bounce" during rapid cycling of the switch, so that under the critical conditions for which it is intended the switch of this invention provides an accuracy of timing which is, for many applications, comparable to that of electronic switching apparatus.

With the above and other objects in view which will appear as the description proceeds, this invention resides in a novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

FIGURE 1 is a longitudinal sectional view of a dry reed switch embodying the principles of this invention, shown in its normal switch-open condition;

FIGURE 2 is a view similar to FIGURE 1 but showing the switch in its closed condition;

FIGURE 3 is a cross-sectional view taken on the plane of the line 3—3 in FIGURE 1, but on an enlarged scale.

Figure 4:
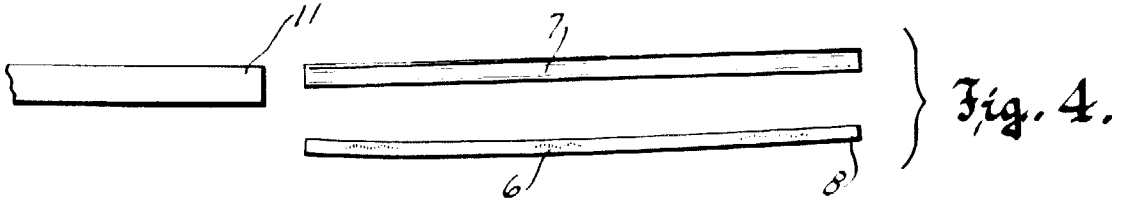
FIGURE 4 is a composite view of one of the reeds of a switch of this invention and its post, the two being shown in disassembled relation to illustrate the curvature that the reed has when in relaxed condition and by which it tends to be maintained engaged with its post under bias in the assembled switch.

Referring now more particularly to the accompanying drawings, the normally open dry reed switch 5 of the present invention is characterized by the fact that its reeds are arranged in pairs, each pair comprising an electrically conductive and magnetically permeable flexible reed 6 and a substantially stiffer reed or post 7 which may also be of magnetically permeable material and which extends alongside the flexible reed 6 and is normally in contact with the latter along most of its length. It is an important feature of this invention that the thinner reed 6 tends to remain in engagement with the post 7 under bias, or in other words is preloaded toward the post so as to bear against the same with some force when the switch is in its open and at-rest condition.

The inner tip portions 8 of the two flexible reeds 6 provide the actual contactors of the switch, while the stiffer reed or post 7 of each pair of reeds cooperates with its flexible reed 6 to increase the frequency and decrease the amplitude of the normal mechanical vibration of the reed, and also to improve the magnetic performance of the switch, all as hereinafter explained. It will be apparent that the posts 7 can be made of the same material as the flexible reeds 6, but that they should have a thicker cross-section.

As is conventional, the reeds of the switch of this invention are housed in a tubular envelope 9 of glass or other inert and electrically non-conductive material. The envelope may be evacuated in the sense that its interior does not contain atmospheric air; that is, it may be under a partial or a substantially complete vacuum, or it may be filled with an inert gas, depending upon the purpose for which the device is intended, all as is well understood in the art.

The two pairs of reeds extend into the envelope substantially axially from opposite ends thereof, and they have their free end or tip portions 8 overlapped in the medial portion of the envelope but laterally spaced apart to define a gap 13 between them. Each pair of reeds is fastened, as by small welds 10, to the inner end of a rod-like carrier 11 which projects coaxially through an end wall of the envelope, the material of the envelope being fused around the rod and the welds 10 to insure a rigid mounting of the carrier and a good seal between the carrier and the envelope. The outer end of the carrier 11 projects beyond the envelope to provide a terminal 14 for the switch.

Each pair of reeds is arranged with its flexible reed 6 nearer the flexible reed 6 of the other pair. In other words, each post 7 is located at the side of its flexible reed 6 that is remote from the other flexible reed.

The two reeds 6 and 7 of each pair are in effect connected at their captive ends 12 by reason of their mutual securement to the inner end of the carrier 11, but otherwise they are free to flex independently of one another along their entire lengths. Furthermore the two reeds 6 and 7 of each pair are preferably equal in length so that their tips are even with one another.

Contrary to what is suggested by prior teachings in this art, there appears to be no particular advantage in forming the posts 7 of magnetically permeable material. It might seen that if both the posts and the reeds were magnetically permeable, a magnetic field applied to the switch and threading lengthwise through the reed pairs and the gap 13 would not only attract the tips of the thinner reeds toward one another but would also produce repulsion between each reed 6 and its post 7. I have found that this repulsion effect exists, it at all, only until the reed 6 has separated very slightly from its post. After initial separation, however, there can exist a difference in magnetic force (NI) between the reed and the post; and if the magnetic actuating field has a sufficiently large NI value to magnetically saturate the thinner reeds when their tips are engaged, the difference in magnetic force between each reed 6 and its post 7 can become great enough to cause the post to follow its reed. The switch closed conditions illustrated in FIGURE 2 do exist when the actuating magnetic field has just adequate force for switch closure, but if the NI value of that field were to be substantially increased, the tips of the posts 7 would be found to be engaged with those of their respective reeds 6, rather than being further spaced from them as might be supposed.

While there may be no substantial performance advantage in making the posts 7 of magnetically permeable material, there is also no substantial disadvantage in doing so, and hence, as indicated above, it may be convenient from a production standpoint to make the posts 7 of the same material as the reeds 6. Again, it is not essential from the standpoint of switch performance that each post 7 have the same length as its reed 6, but production is facilitated by having the post and reed equal in length.

Figure 5:
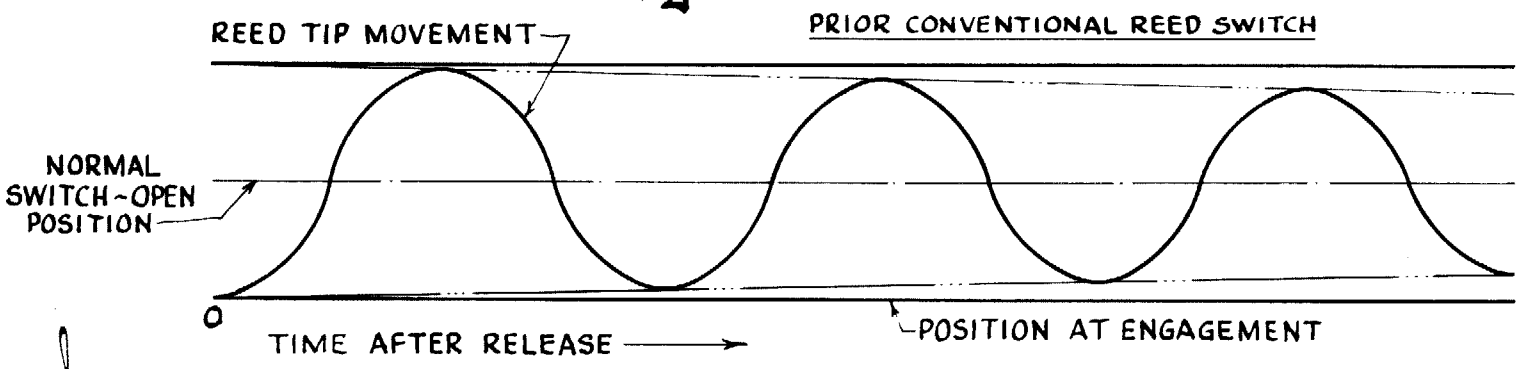
FIGURE 5 is a graph showing the movement of the tip of one of the reeds of a prior conventional reed switch during an interval following separation of the switch contacts.

Closure of the switch of this invention in precisely timed relation to magnetic field build-up is assured by the function of the posts 7 immediately after switch opening. In the absence of the posts, the flexible reeds 6 would vibrate for a time under the inertia of their opening motion, and such vibratory movement would swing each reed through substantially equal distances to opposite sides of its normal switch-open position. FIGURE 5 illustrates the motion that the tip of one reed would have during such vibratory motion in the absence of the post.

As mentioned above, each of the reeds 6 has a preload by which it tends to engage its post 7, near the tip of the latter, under bias. This preload results from the fact that the reed 6 is made with a curvature along its length (see FIGURE 4) and is clamped into flatwise engagement with its post 7 during welding or other securement of the reed and the post to their rod-like carrier 11. Hence in the assembled switch the reed has flexing stresses which tend to maintain its tip portion engaged under bias with the post.

This preload upon each reed 6 has several important cosequences.

In the first place, the preload insures very rapid separation of the contacts when the actuating magnetic field decreases to the switch opening value, even though the normal gap 13 between the reeds at rest is very small. Hence a switch of this invention can be designed with its gap 13 extremely small, to the point where the size of the gap is controlled by production considerations and voltage requirements of the circuit in which the switch is to be used; and this small gap, in turn, causes the switch to respond rapidly and dependably to magnetic actuating fields of small value. Further, because of the small gap, the reeds cannot, during their closing movements, build up such momentum as produces contact bounce.

In another respect, too, the preload upon the reeds 6 causes the switch of this invention to have a very rapid and positive closing action. It will be apparent that the actuating magnetic field must have risen to a substantially high value before the preload is overcome to the point where the reed 6 begins to be actuated away from its post 7; but the stresses subsequently imposed upon the reed by its flexing to its closed position are relatively small in relation to its preload. Hence, once the tip of the reed 6 separates from the tip of its post 7, the magnetic attraction between the reed tips increases much more rapidly than the stresses in the reeds.

A further and very important conseqeunce of the preload upon each reed 6 is that the mechanical vibration of the reed which follows each opening of the switch is of relatively high frequency and low amplitude. Because of its preload, the reed 6 accelerates rapidly away from its switch-closed position (shown in FIGURE 2) when the actuating magnetic field decreases to the switch-open value, acquiring sufficient momentum to strike its post 7 with a force that causes it to rebound from the post. On the rebound, the reed swings nearly back to its closed position, but because of internal friction in the reed it will not go all the way to that position. If the envelope 11 is evacuated to a deep vacuum, a close approach of the rebounding reeds will be of no consequence. Where the reeds are not in a deep vacuum environment, and some arc-over after switch opening is tolerated or desired, any close approach of the reed tips to one another will likewise be of no consequence.

Because of the recurrent rebounding of the reed from the post, the frequency of vibration of the reed is substantially higher than its natural mechanical mode, but the amplitude of its vibration is substantially smaller than it would be if the reed were in free vibration. The oscillations of the reed tip are plotted in FIGURE 6. The peculiar shape of the curve in FIGURE 6, characterized by a sharp peak at each rebound point, is in contrast to the slightly damped sine form of the FIGURE 5 curve. Also note from FIGURE 6 that at each successive rebound the reed tip swings through a slightly diminished distance. However, because the resilient reed 6 engages the post only at its tip, there is no substantial frictional damping between the reed and the post; therefore the rate of damping of the reed's vibration is not substantially greater than it would be in pure free vibration such as is illustrated in FIGURE 5. Hence in a rapidly cycling system the reeds will still be in vibration from the previous opening when the next succeeding closure of the switch is to take place.

Figure 6:
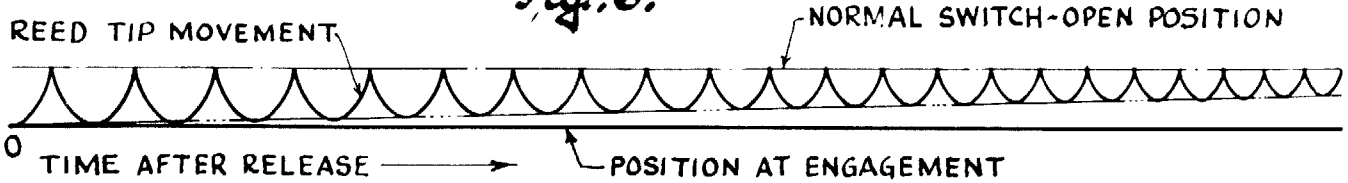
FIGURE 6 is a graph comparable to FIGURE 5 but showing the movement of the tip of a reed in the switch of the present invention.

When the reeds are in vibration as depicted in FIGURE 6, the mean air gap between them is smaller than when they are at rest, and hence a build-up in the actuating magnetic field can pick up the reeds at a time when they are closer to their contacting positions then they would be if they were at rest, so that the magnetic field need only swing the reeds through a small distance to bring their tips into contact. In consequence, closing of the switch is faster, more positive and in more precisely timed relation to the magnetic field cycle than if the reeds were at rest or in free vibration, and the reeds acquire less momentum in swinging toward one another and are therefore less prone to "make bounce."

It will be understood that each post 7 is placed in vibration by the recurrent rebounds of its reed against it, but because of its greater rigidity the mechanical mode of the post has a substantially higher amplitude and lower frequency than the reed. Furthermore, the frequency and amplitude of post vibration are affected by the recurrent collisions with the reed in the same way that the reed is affected by the post. Hence for practical purposes the post can be assumed to be substantially stationary.

From the foregoing description taken together with the accompanying drawings it will be apparent that this invention provides a normally open reed switch having very simple, inexpensive and effective means for insuring that switch closure will always occur substantially without "make bounce" and in precisely timed relationship to each build-up in a cyclically varying magnetic field.

What is claimed as my invention is:

[1. In a magnetically actuated switch of the type comprising a conductive reed mounted at one end and having its opposite end portion in normally spaced relationship to a cooperating conductive and magnetically permeable contact member, said reed being resiliently flexible and magnetically permeable so that it can be flexed to bring its said opposite end portion into switch closing contact with said contact member by a magnetic field threading the reed, the contact member and the space between the contact member and said opposite end portion of the reed, means for stabilizing the timing of each of a rapid succession of closures of the switch so that each closure occurs just as a cyclically varying magnetic field builds to a predetermined value, said means comprising: a post stiffer than the reed and having an end fixed to the reed near the fixed end of the reed, said post extending alongside the reed at the side thereof remote from the contact member, and the reed being normally engaged with the post under bias when the reed is at rest.]

2. A magnetically actuated switch adapted for rapidly recurrent opening and closing, said switch comprising:

A. an evacuated tubular envelope;

B. a pair of electrically conductive reeds (1) anchored to the envelope at opposite ends thereof and extending substantially axially into the envelope, (2) said reeds having tip portions in the medial portion of the envelope which are in overlapping relationship and which are normally spaced apart by a predetermined distance.

(3) said reeds being resiliently flexible and magnetically permeable so that they can be flexed toward one another, to carry their tip portions into switch closing engagement, by means of a magnetic field threading the reeds and the gap between their tip portions, and (4) said reeds being under flexing bias which urges them beyond said predetermined distance apart; and C. a pair of substantially stiffer reeds, one for each of said flexible reeds,

[(1) each of said stiffer reeds being anchored to the envelope adjacent to the anchorage of its flexible reed and extending lengthwise along its flexible reed,]

*(1) means independent of the envelope providing an anchorage between each stiffer reed and its flexible reed, with the stiffer reed extending lengthwise along its flexible reed, so that said reeds comprise a unitary structure,*

*(2) each of said unitary structures being anchored to the envelope adjacent to said anchorage,*

[(2)] *(3)* each of said stiffer reeds being located at the side of its flexible reed that is remote from the other flexible reed, and

[(3)] *(4)* each of said stiffer reeds normally serving as a stop which prevents separation of the first designated reeds by more than said predetermined distance.

3. A dry reed switch adapted for rapidly recurrent opening and closing comprising:

A. an evacuated tubular envelope;

B. a magnetically permeable conductive contact member fixed to one end of the envelope and extending substantially axially thereinto;

C. a pair of reeds, (1) one of said reeds being resiliently flexible and magnetically permeable, and (2) the other reed being substantially stiffer;

D. means mounting the two reeds in lengthwise adjacent side-by-side relationship with their adjacent ends fixed to a common anchorage and with their opposite end portions substantially free for independent flexing motion and normally engaging one another under flexing bias [;], *said means being independent of the envelope so that the two reeds and said means together comprise a structural unit;*

E. means fixing the first designated ends of the two reeds to the opposite end of the envelope (1) with said pair of reeds extending substantially axially into the envelope, (2) with said opposite end portion of the first designated reed overlapping the inner end portion of the contact member in the medial portion of the envelope but normally spaced therefrom laterally, and (3) with the stiffer reed at that side of the flexible reed which is remote from the contact member so that the stiffer reed serves as a stop against which the flexible reed strikes and from which it can rebound following switch opening.

4. The dry reed switch of claim 3 further characterized by said contact member comprising:

A. a second resiliently flexible and magnetically permeable reed;

B. a second stiffer reed; and

C. means mounting said second reeds in lengthwise adjacent side-by-side relationship, with their adjacent ends fixed to a common anchorage *independent of the envelope,* with said second stiffer reed at the side of said second flexible reed that is remote from the first designated pair of reeds, and with the opposite end portions of said second reeds free for independent flexing motion but normally engaging one another under bias.

5. A magnetically actuated switch of the type having a pair of reeds, each fixed at one end and having its free end portion laterally adjacent to that of the other reed and normally spaced therefrom by a predetermined distance, said reeds being resiliently flexible and magnetically permeable so that a magnetic flux threading the reeds and the space between their free end portions flexingly swings their free end portions into engagement, said switch being characterized by:

A. the free end portion of each of said reeds benig flexingly so biased as to be urged beyond said predetermined distance from the free end portion of the other reed; and B. a rebound stop member for each reed, at the side of the reed remote from the other, by which the reed is normally held against its bias to maintain its free end portion at said predetermined distance from that of the other reed, each of said rebound stop members comprising a post-like elongated member having one end fixedly connected with the fixed end of its reed [and] *independently of other parts of the switch, so that each rebound stop member and its reed together comprise a structural unit, each of said rebound stop members* extending along its reed substantially all the way to the free end of the latter.

6. The magnetically actuated switch of claim 5, further characterized by:

each of said rebound stop members being (1) magnetically permeable and (2) in magnetic shunt circuit with its reed.

*7. In a magnetically actuated switch of the type comprising a conductive reed mounted at one end and having its opposite end portion in normally spaced relationship to a cooperating conductive and magnetically permeable contact member, said reed being resiliently flexible and magnetically permeable so that it can be flexed to bring its said opposite end portion into switch closing contact with said contact member by a magnetic field threading the reed, the contact member and the space between the contact member and said opposite end portion of the reed, means for stabilizing the timing of each of a rapid succession of closures of the switch so that each closure occurs just as a cyclically varying magnetic field builds to a predetermined value, said means comprising: a post which*

*is stiffer than the reed and which has a fixed end and a free end, said post extending alongside the reed at the side thereof remote from the contact member; and means providing an anchorage between the fixed ends of the reed and the post so that the reed and the post, together with said anchorage means, comprise a structural unit independent of other parts of the switch, the reed being normally engaged with the post under bias when the reed is at rest and relaxed.*

References Cited

The following references, cited by the Examiner, are of record in the patented file of this patent or the original patent.

UNITED STATES PATENTS

| | | | |
|---|---|---|---|
| 1,531,347 | 3/1925 | Rhodes | 335—193 |
| 2,264,124 | 11/1941 | Schreiner | 335—5 |
| 2,264,746 | 12/1941 | Ellwood | 335—154 |
| 2,450,499 | 10/1948 | Brown | 335—154 |
| 2,497,547 | 2/1950 | Hastings | 335—270 |
| 2,929,895 | 3/1960 | Shebanow | 335—154 |
| 2,969,434 | 1/1961 | McGuire et al. | 335—152 |
| 2,993,104 | 7/1961 | Zimmer | 335—154 |
| 3,025,371 | 3/1962 | Medal | 335—133 |
| 3,059,074 | 10/1962 | Dal Bianco et al. | 335—154 |
| 3,165,608 | 1/1965 | Wallace | 335—196 |

BERNARD A. GILHEANY, Primary Examiner

R. N. ENVALL, Jr., Assistant Examiner